Sept. 4, 1951.  E. E. WEMP  2,567,043
TRANSMISSION AND CLUTCH CONTROL

Original Filed Nov. 20, 1944  7 Sheets-Sheet 5

INVENTOR.
Ernest E. Wemp
BY
Barnes, Kisselle, Laughlin & Raisch
Atto.

Patented Sept. 4, 1951

2,567,043

UNITED STATES PATENT OFFICE 2,567,043

TRANSMISSION AND CLUTCH CONTROL

Ernest E. Wemp, Detroit, Mich.

Original application November 20, 1944, Serial No. 564,216, now Patent No. 2,505,448, dated April 25, 1950. Divided and this application September 28, 1949, Serial No. 118,238

7 Claims. (Cl. 74—472)

This invention relates to a transmission of power and it has to do especially with a mechanism particularly adapted for use in an automotive vehicle.

This application is a division of co-pending application Serial No. 564,216 filed November 20, 1944, now Patent No. 2,505,448 dated April 25, 1950.

The general object and intention of the invention is to provide a mechanism which embodies a gear change transmission for effecting various gear ratios between the engine of an automotive vehicle and the traction wheels, together with means for controlling the transmission and for otherwise controlling and governing the power transmitting line or torque line, so that the operation of the mechanism in the vehicle is greatly simplified, requiring a minimum of functions and duties of the operator and, in effect, making the operation of the mechanism and the vehicle and the gear changing functions of a semi-automatic nature. To these ends a mechanism constructed in accordance with the invention embodies a number of elements, such as an automatic clutch which advantageously and preferably is a centrifugal clutch, a power coupler which is capable of establishing a connection in the torque transmitting line while both the driving member and the driven member of the power coupler are under a torque load, a gear change transmission which may be of a conventional nature. In conjunction with these elements, there is a controlling system which may be, and preferably is hydraulic, and this system, in its fullest form, performs controlling functions on the gear change transmission, the power coupler and the clutch.

The mechanism provides for the changing of the gear ratios in a semi-automatic manner, without requiring an over-expensive or complicated gear change transmission, and at the same time it provides a wide latitude for the exercise of the operator's individual judgment and desires. The centrifugal clutch is one which remains disengaged at normal engine idling speeds and, therefore, is disengaged when the vehicle is at rest. The invention includes an arrangement, whereby upon towing or pushing of the vehicle, the engine may be turned over and started even though the centrifugal clutch is normally disengaged while the engine is at rest. While the invention is especially adapted for use in automotive vehicles and is so disclosed herein, the invention may be employed in other places where similar conditions exist. Other objects and advantages of the invention will be brought out as the detailed description is considered in conjunction with the accompanying drawings:

Figure 1:
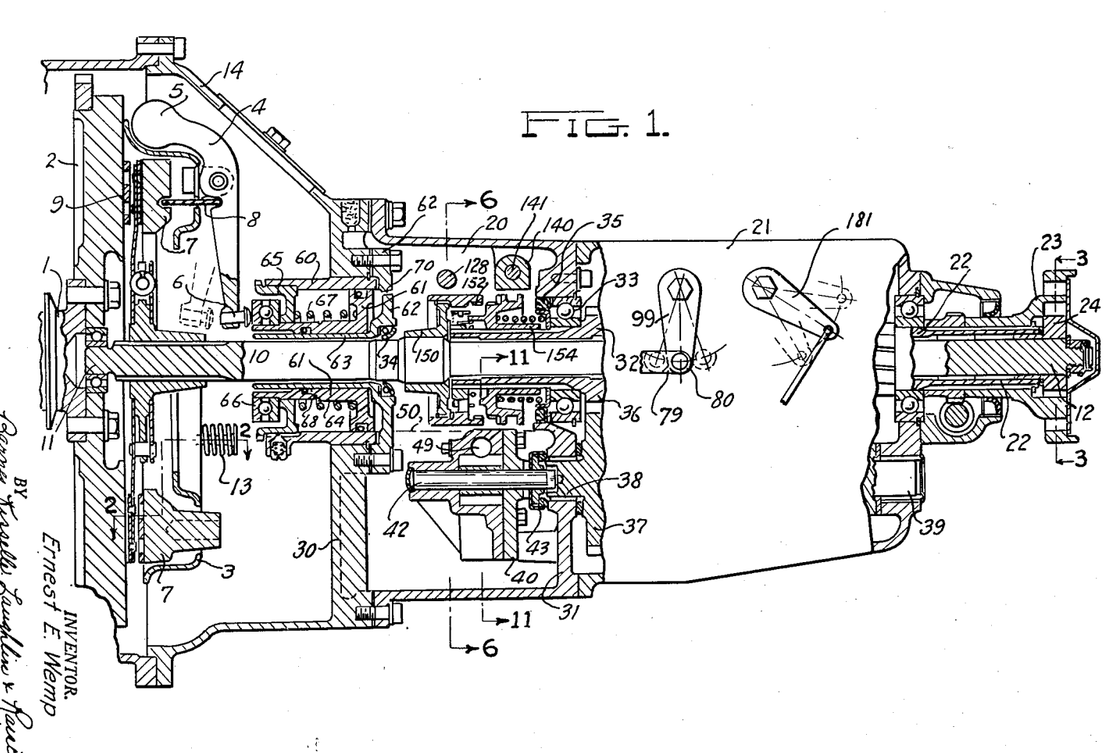
Fig. 1 is a view largely in cross section showing such parts as the centrifugal clutch, the power coupler, the transmission, and associated controlling elements.

Referring first to Fig. 1, the crank shaft of an engine is shown at 1 and it carries a fly wheel 2. The centrifugal clutch construction includes a cover plate 3 secured to the fly wheel and which carries levers 4 having unbalanced centrifugal masses 5 and lever tips 6. The swinging movement of the levers serve to shift the pressure plate 7 to the left as the figure is viewed, through the means of struts 8. In this action, a clutch driven disc having suitable facings thereon, as shown at 9, is frictionally engaged between the pressure plate and the fly wheel. The driven disc is drivingly mounted upon a clutch shaft 10, one end of which is piloted in the fly wheel, as at 11, and the other end of which extends through the mechanism and projects from the transmission as shown at 12. The pressure plate is normally held retracted by retractor springs 13. This particular clutch construction is more fully described and claimed in application Serial No. 291,574, filed August 23, 1939, now Patent No. 2,371,564 dated March 13, 1945, and no further detailed description is needed herein. Suffice it to say that there are a number of circumferentially arranged levers, preferably three, and a plurality of circumferentially arranged retractor springs. The clutch is disposed in a clutch housing generally shown at 14.

Next adjacent the clutch housing is a housing or compartment 20 which contains the hydraulic system including a hydraulic pump and control valves. Next adjacent the chamber 20 is a gear change transmission indicated at 21. This transmission may be of a conventional type for providing three forward speeds, namely, low, intermediate and high, and one speed in reverse. Of course, the transmission provides for a neutral condition where no driving connection exists in the transmission. In this transmission the train of gears for the low gear ratio embodies an overrunning coupling so that when the transmission is conditioned for the intermediate or the high gear ratio the overrunning coupling of the low gear train functions to permit overrunning action of some of the gears of the low gear train so that these gears may remain in mesh with each other while the torque is transmitted through the higher gear ratios. This is a conventional transmission construction and needs no further disclosure or explanation.

Figures 2, 3, 5:
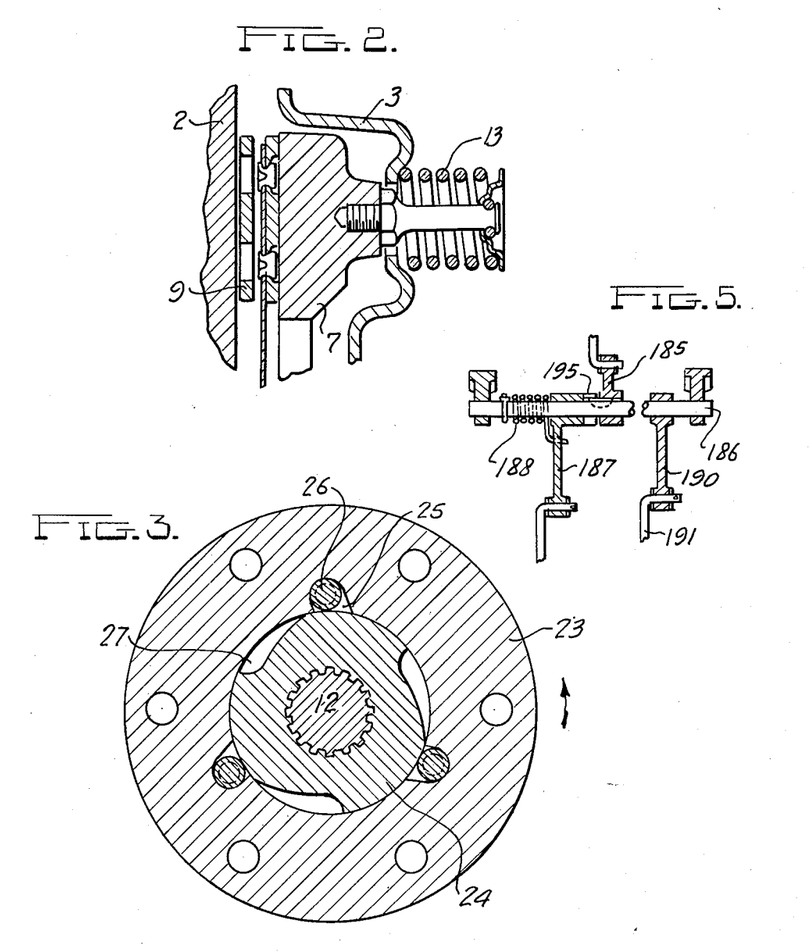
Fig. 2 is a detailed sectional view taken substantially on line 2—2 of Fig. 1 showing a clutch retractor spring.
Fig. 3 is a sectional view taken substantially on line 3—3 of Fig. 1 showing an emergency one-way drive coupling.
Fig. 5 is a sectional view taken substantially on line 5—5 of Fig. 4 showing some of the control levers.

As stated above, the clutch shaft 10 extends freely through the transmission. The torque output member for the transmission is shown at 22 in the form of a sleeve surrounding the rear end of the clutch shaft and mounted thereon is the outer member 23 of a one-way drive coupling, as shown in Fig. 3. The inner member of the one-way driven coupling at 24 is mounted on the clutch shaft. As shown in Fig. 3, the outer member 23 has recesses 25 for receiving rollers 26 designed to cooperate with notches 27 on the inner member 24. In the normal operation while the output member 22 is driving the vehicle, the rollers 26 are held outwardly in their pockets centrifugally and are ineffective. The normal direction of rotation of the parts is counter-clockwise as Fig. 3 is viewed, and it will be seen that the clutch shaft will not drive the member 23 as the rollers are cammed up the long angular faces of the notches 27. However, when the parts are at rest and a movement is given to the vehicle, one of the rollers will gravitate into a compressively engaged condition between a wall of its notch 25 and the abrupt wall of one of the notches 27 so that the clutch shaft will be driven in a counter-clockwise direction as Fig. 3 is viewed. The purpose of this is for an emergency starting of the engine by towing or pushing the vehicle, as will be more fully understood as the detailed description progresses.

Figure 11:
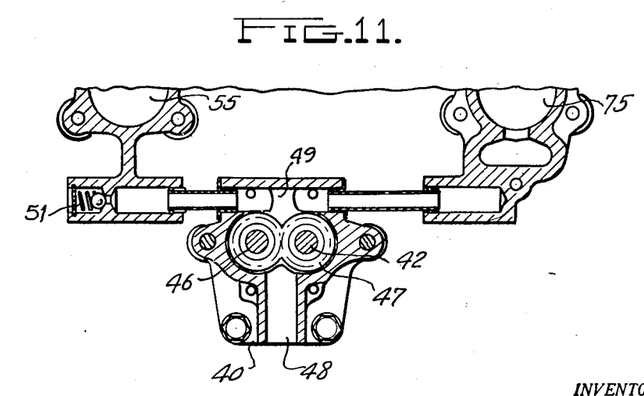
Fig. 11 is a sectional view taken substantially on line 11—11 of Fig. 1 showing the pump and high pressure line of the hydraulic system.

The chamber 20 for the hydraulic pump is defined by a partition 30 and partition 31 which divides off the clutch housing and the transmission. The transmission input member 32 is journalled in the partition, as at 33, and suitable seals are used as at 34 and 35 where the clutch shaft and the power input member extend through these partitions. The input member 32 has a gear formation 36 which drives a gear 37 on a counter-shaft which is journalled in the partition 31 as at 38 and at the rear end of the transmission case, as shown at 39. The pump has a body generally shown at 40, in which is journalled a shaft 42 coupled to the gear 37, and a suitable seal structure 43 is employed to seal the housing. As shown in Fig. 11, the pump is in the form of a gear pump having two gears 46 and 47 for moving oil through the inlet 48 to the outlet or high pressure side of the pump at 49. The pump is preferably submerged in the liquid or oil, the normal level of which may be as indicated at 50. The outlet side of the pump is provided with a pressure relief valve 51 as shown in Fig. 11.

The high pressure side of the pump is connected to deliver liquid under pressure to several operating elements. These include a piston and cylinder arrangement for acting upon the friction clutch so that the clutch may be engaged hydraulically and so that the hydraulic pressure may supplement centrifugal force in engaging the clutch. Also, the high pressure side of the pump is connected to a piston and cylinder arrangement for controlling the power coupling and to a cylinder and piston arrangement for causing a change of gearing in the transmission. Control valves are located in the high pressure line to effect a proper control and operation of these hydraulically actuated elements.

Figure 7:
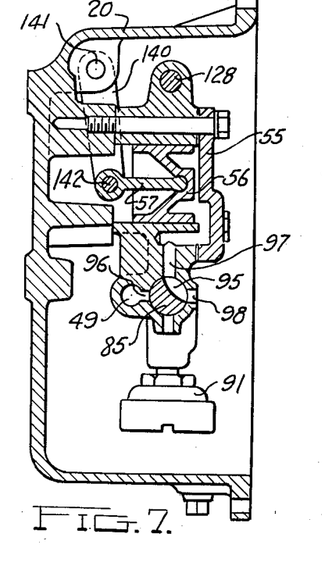
Fig. 7 is a sectional view taken substantially on line 7—7 of Fig. 6 looking to the right as Fig. 6 is viewed.
Figure 8:
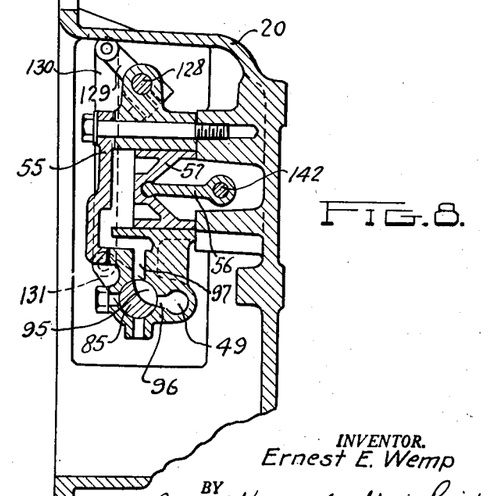
Fig. 8 is a sectional view similar to Fig. 7 but reversed in position.

The power coupler control cylinder is illustrated in Figs. 7 and 8, the cylinder being shown at 55, its piston at 56, and its strut-like connecting rod at 57. Fig. 8 shows the piston shifted hydraulically to the limit of its movement.

Figures 12, 13, 14, 15, 15B, 16, 17:
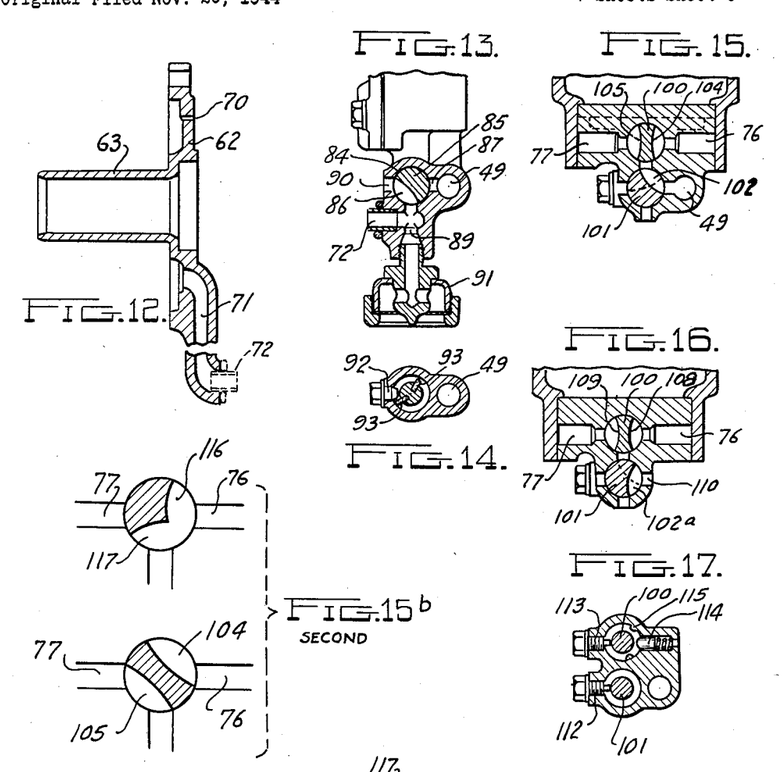
Fig. 12 is a detailed sectional view showing the cylinder head for the clutch controlling cylinder and showing the liquid line.
Fig. 13 is a sectional view taken substantially on line 13—13 of Fig. 6 showing one of the control valves in the hydraulic system and the low pressure controlling valve.
Fig. 14 is a sectional view taken substantially on line 14—14 of Fig. 6 illustrating the limited movement of one of the controlling valves.
Fig. 15 is a sectional view taken substantially on line 15—15 of Fig. 6 showing other control valves in the hydraulic system.
Fig. 15b is a view similar to Fig. 15a showing the position of ports in the selector valve when it is shifted to second gear position.
Fig. 16 is a sectional view taken substantially on line 16—16 of Fig. 6 illustrating further controlling valves.
Fig. 17 is a sectional view taken substantially on line 17—17 of Fig. 6 showing some of the structure of the valves shown in Figs. 16 and 17.

The clutch actuating cylinder is shown in Fig. 1, the cylinder being illustrated at 60 mounted in the partition 30 and having a piston 61 therein. The head of the cylinder 62 has an extension 63 and the piston has a sleeve 64 which slides through an adjustable head 65 and carries on its exposed end an anti-thrust bearing 66. A spring 67 normally urges the piston to the right as Fig. 1 is viewed. When the piston is shifted to the left by liquid under pressure, the anti-friction bearing engages the levers 4 and swings them to cause clutch engagement or to supply supplemental clutch engaging pressure. The head 65 is screw threaded in position and may be adjusted in order to vary the stroke of the piston to take up the wear of the facings 9. The bearing 66 limits piston movement striking the head 65 and a shoulder 68 limits movement of the piston in clutch engaging direction. The head of the cylinder is vented as at 70 to prevent trapping of air. The head 62 of the cylinder has a passage 71 therein (Fig. 12) connected as at 72 to the pump line as will more clearly appear later (Fig. 13).

Figure 9:
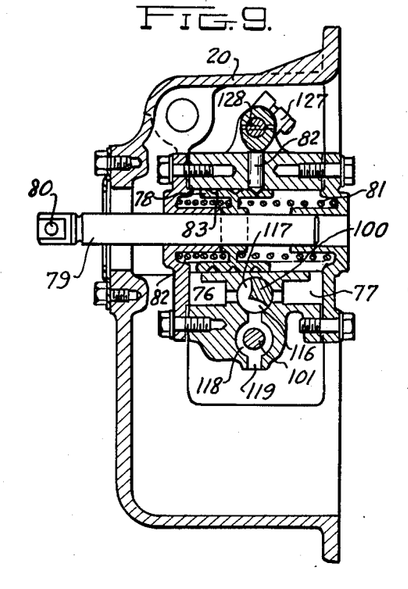
Fig. 9 is a sectional view taken substantially on line 9—9 of Fig. 6 looking to the right as Fig. 6 is viewed, showing the control cylinder for the transmission.
Figure 10:
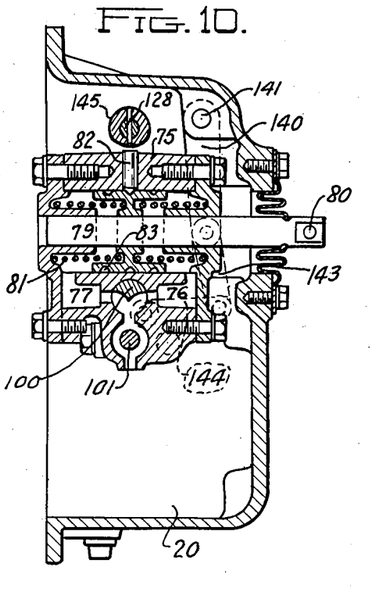
Fig. 10 is a cross sectional view similar to Fig. 9 but reversed relative to Fig. 9.

The positions of the gear shift servo piston are shown in Figs. 9 and 10. The cylinder 75 is double ended and has passage 76 and 77 leading to its opposite ends. The piston 78 is mounted on a reciprocatory rod 79 connected to a shifter 99 of the transmission as at 80. The shifter 99 is operable to effect different gear ratios between the power input member 32 and the power output member 22 in the usual manner of a gear change transmission. The piston is preferably balanced in the cylinder by opposed springs 81 and 82. In the neutral or central position, the parts are shown as in Fig. 10. When the piston is shifted in one direction the parts are as illustrated in Fig. 9. There is a detent 82 which functions in notches 83 in the piston 78 and which serves, under certain conditions, to mechanically lock the piston in any one of the three positions of adjustment.

Considering, now, the control valve system, which includes the controlling valves located between the pump and the several servo cylinders. The high pressure line 49, as shown in Fig. 11, comprises various tubing connections which are necessary for assembly purposes but the character 49 is applied to all portions of this high pressure line. As shown in Fig. 13, a valve chamber 84 is positioned between the high pressure line 49 and the connection 72 to the clutch servo cylinder, and in this chamber is a valve 85 with a port 86. Shift of this valve through about 90° causes the port 86 to connect ports 87 and 89. In the position shown, the high pressure line is closed and the cylinder is open to the exhaust port 90. A low pressure relief valve is shown at 91 and which is connected to the high pressure line at the same time the clutch servo cylinder is connected to the high pressure line. Details of this valve are set forth in a separate application and suffice it to say here that it maintains a desired low pressure in the system while it is connected to the pump outlet. Rocking movement of the valve 85 may be limited by the stop 92 functioning in conjunction with stop pins 93 (Fig. 14). The valve 85 is also ported at 95 so that it may connect the power coupler cylinder with the high pressure line through the means of ports 96 and 97 and connect the power coupler cylinder with the discharge port 98 (Fig. 7).

Figure 6:
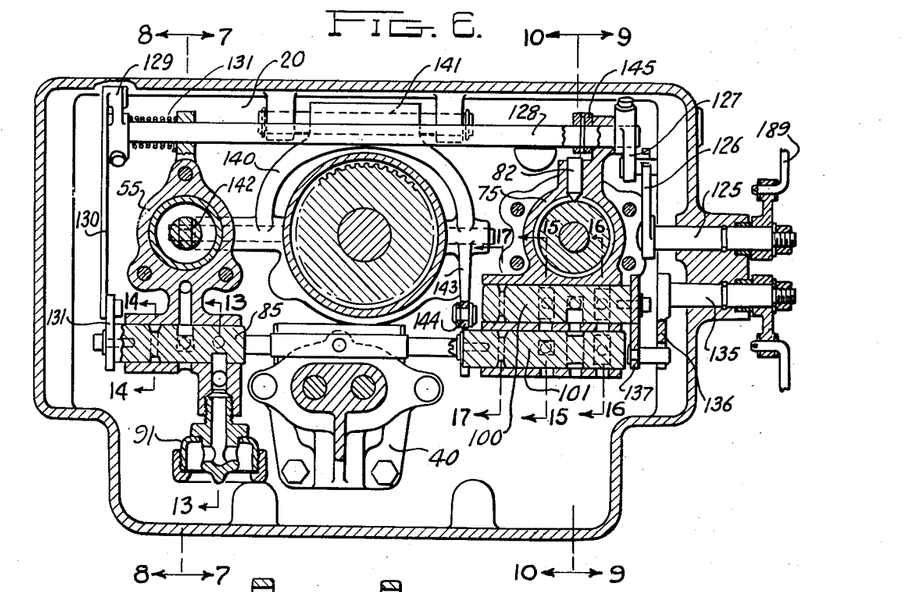
Fig. 6 is a sectional view taken substantially on line 6—6 of Fig. 1 showing some of the hydraulic control system and the control valves.

It will be observed by reference to Fig. 6 that the valve 85 is conveniently located on one side of the center line while two other valves are mounted on the opposite side of the center line. One of these valves, namely, the upper valve 100 may be called the selector valve while the other valve 101 is a form of control valve and these two valves work in conjunction with each other. They control the admission and discharge of liquid to and from the opposite ends of the transmission servo cylinder 75. As shown in Fig. 15 the valve 101 is positioned between the high pressure line 49 and the chamber of the valve 100. The valve 101 is ported at 102 so that it may connect the high pressure line 49 and the chamber of valve 100. In the location of the section of Fig. 15 the valve 100 is doubly ported at 104 and 105. In the position shown it closes the port from the chamber of valve 100 and, therefore, closes from the high pressure line the passage 77 and 76. This valve is movable to the position shown in Fig. 15b in which position it may connect the high pressure line to the passage 77 so that high pressure liquid may be connected to the cylinder 75 (Fig. 9). This valve may be moved to the position as shown in Fig. 15c, so as to connect the high pressure line to the passage 76 and, accordingly, to the opposite end of the transmission servo cylinder.

The two valves are similarly formed at another location, as shown in Fig. 16, the valve 100 being doubly ported at 108 and 109 and the valve 101 is ported so as to connect to a discharge port 110. Considering Fig. 16, if the valve 100 is moved approximately 45° counter-clockwise, the passage 77 may be connected to the discharge port 110, if the control valve 101 permits. If the valve 100 is shifted to approximately 45° clockwise, the passage 76 may be connected to the discharge port 110 if the valve 101 permits.

As shown in Fig. 17, the valve 101 is held against axial movement by a pin 112; the valve 100 is held against axial movement by a pin 113 and there is a spring pressed detent 114 which functions in three sets of notches 115 located in the sides of the groove provided for the pin 113. As shown in Figs. 9 and 10 the valve 100 is doubly ported as at 116 and 117, while at this location the valve 101 has a circumferential groove 118 in constant communication with a discharge port 119. The ports 116 and 117 are arranged to register with the ports leading to the passages 76 and 77.

Figures 15A, 15C:
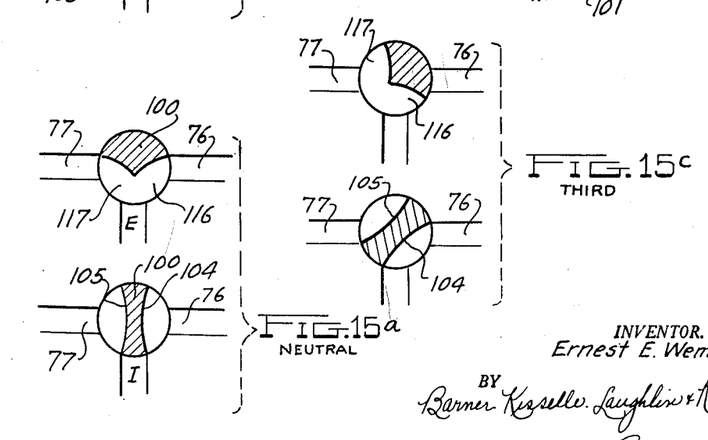
Fig. 15a is a diagrammatic view showing the position of ports in the selector valve when the valve is in a neutral position.
Fig. 15c is a diagrammatic view similar to Figs. 15a and 15b showing position of ports in the selector valve when it is shifted to third gear position.

As illustrated in Fig. 15a, when the valve 100 is positioned so that it blocks off the high pressure line, the ports 116 and 117 are positioned to discharge liquid from both ends of the transmission servo cylinder through the control valve 101 and port 119. When the selector valve 100 is positioned as shown in Fig. 15b, with the port 105 positioned to direct high pressure liquid into passage 77, and thus into the left hand end of the transmission servo cylinder, as Fig. 10 is viewed, the left hand end of the cylinder connecting the passage 77 is closed. But, the right hand end of the cylinder is exhausted through the ports 116 and 117. When the selector valve is positioned, as shown in Fig. 15c, the port 104 connects the high pressure liquid to the passage 76 and the right hand end of the transmission servo cylinder as Fig. 10 is viewed, while the ports 117 and 116 exhaust the opposite end of the cylinder.

The actuating mechanism for these valves is shown in Figs. 6 through 10, inclusive. For the valve 85, there is a shaft 125 which, through an arm 126 engaging a pin on arm 127, rocks a cross shaft 128. This shaft has an arm 129 connected by a link 130 to an arm 131 on the valve. A coil spring 131 keeps the valve normally positioned in a manner presently to be brought out. For the selector valve 100 there is a shaft 135 with an arm 136 connected to a pin on an arm 137 on the valve 100.

The control valve 101 is operated indirectly from the power coupling piston 56, in turn controlled by the valve 85. A yoke 140 is pivoted as as 141 and connected at 142 to the connecting rod 57. This yoke has a depending arm 143 connected by a link 144 to the valve 101. At this point it may also be brought out that the cross shaft 128 is provided with a cam 145 for cooperating with the detent 82.

Before going into a description of the operator actuated control means for these valves and the other functions of the hydraulic system, a disclosure of the power coupling appears to be appropriate inasmuch as this coupling is located in the housing 20. This particular coupling is of the type described and claimed in application Serial No. 291,574, and, accordingly, a brief description herein will suffice. As mentioned above, the clutch shaft extends freely through the transmission. The power coupler is located between the clutch shaft and the transmission power input member 32. The clutch shaft has a hub member 150 with a member thereon which is the driving member of the power coupler, this member being shown at 151 and it has teeth 152. The power input member 32 has a sleeve formation with a spline structure thereon of helical nature and in the present arrangement the spline is left handed, as shown at 153. Mounted on these splines is a coupler member 154 with a groove 155 for receiving the shoes on the yoke 140. This coupler is acted upon by a spring 156 and it has teeth 157 for dental engagement with the teeth 152. There is a bumper of rubber or the like 158 for striking the driving member 151. Accordingly, it will be noted that the driving member 151 is coupled to the clutch shaft whereas the driven member is the power input member 32.

Figure 18:
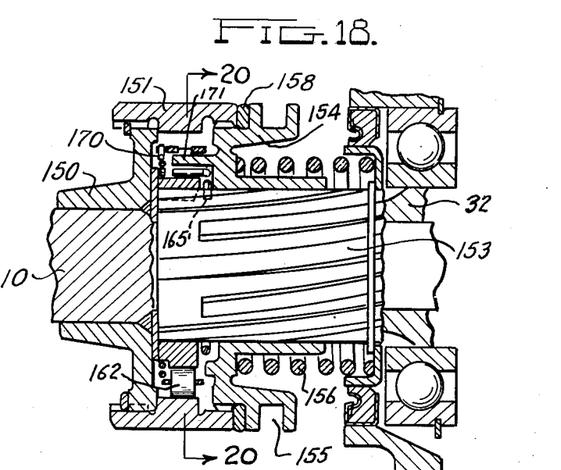
Fig. 18 is a sectional view of the power coupler in engaged condition.
Figures 19, 20, 21:
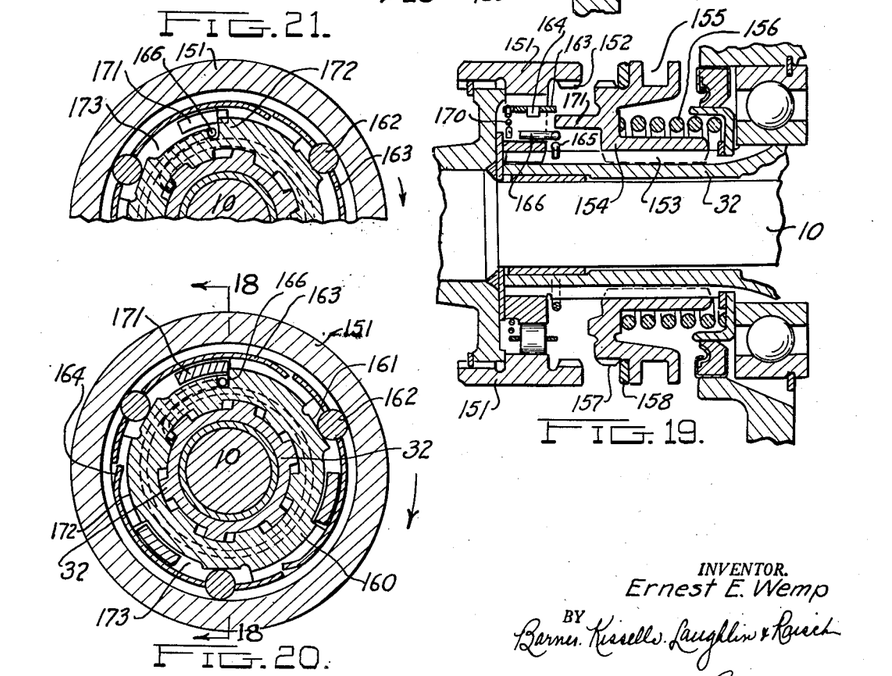
Fig. 19 is a sectional view similar to Fig. 18 showing the power coupler in disengaged condition.
Fig. 20 is a sectional view taken substantially on line 20—20 of Fig. 18 showing the synchronizing parts of the power coupler.
Fig. 21 is a view similar to Fig. 20 showing the parts in another position.

Means are provided for permitting a dental engagement between the teeth 152 and 157 only when the parts are substantially synchronized. As shown in Fig. 20, there is a blocker ring 160 loosely splined on the power input member 32. This member has cam surfaces 161 and rollers 162 cooperate between the cam surfaces and the internal peripheral surface of the driving member 151. The rollers are located as by means of a cage 163 and the cage has depressed portions 164 which ride in a groove in the blocker ring 160 to keep the cage axially centered. There is a coil spring 165 with one end engaging the power input member 32, as shown in Fig. 18, and with its other end engaging the blocker ring 160, as shown at 166 (Fig. 20), and this spring normally loads the blocker ring so as to hold the blocker ring in the position shown in Fig. 21. In this position the blocker ring is held relatively counter-clockwise to the limit of its movement on the loose splines. There is another coil spring 170 which has its ends connected respectively to the blocker ring and to the cage. This spring acts upon the cage and urges it relatively clockwise and so tends to wedge the rollers in between the cam surfaces 161 and the inner peripheral surface of the drive member 151. On the coupler member 154 are blocker abutments or blocker teeth 171 and there may be three of these as shown in Fig. 20.

When the coupler member and the driving member 151 are disengaged as shown in Fig. 1, and in Fig. 19, the blocker ring 160 is urged counter-clockwise or, in other words, from the Fig. 20 position to the Fig. 21 position. The blocker ring has blocking portions 172 which pass in front of the blocking elements 171, as shown in Fig. 21. With the parts in these positions, a dental engagement cannot be made since the coupler 154 cannot shift toward the driving member 151. When, however, the blocker ring is shifted from the position shown in Fig. 21 to the position shown in Fig. 20, the parts 172 move out of blocking position and the blocking teeth 171 may pass into the clearance ways 173 in the blocker ring and the teeth 157 may thereupon move into engagement with the teeth 152.

The operation of this power coupling is, briefly, as follows: When the parts are coupled, as shown in Fig. 18, the clutch shaft 10 may drive the power input member of the transmission 32 through the dental engagement and coupler. When the parts are in a position shown in Fig. 19, the clutch shaft 10 is free of the power input member 32 and there is no driving connection. The normal direction of rotation of parts is clockwise as Figs. 20 and 21 are viewed. As long as the driving member 151 is operating at a speed lower than that of the power input member and, therefore, the coupler 154 (or the driving member may be at rest), the blocker ring maintains the position shown in Fig. 21. When, however, the driving member comes up to the speed of the coupler member and then tends to overrun the coupler member the overrunning clutch rollers 62 take hold and rock the blocker ring from the Fig. 21 position to the Fig. 20 position. Thereupon, unless the parts are otherwise restrained, the spring 156 shifts the coupler 154 to the left as Fig. 19 is viewed and the teeth 152 and 157 become dentally engaged. In this action the blocker elements 171 move into the clearance ways 173. Now, inasmuch as the teeth 152 and 157 may be straight and a period of time is needed to complete the dental engagement, the helical splines are provided which permits the coupler to rotate with the driving member as the teeth are sliding into full engagement before it picks up the load of the power input member. The load is picked up and torque is transmitted when the bumper 158 strikes the driving member 151 and stops axial movement of the coupler. It will be noted that both the driving member 151 and the power input member 32 may be under load, the one being coupled to the engine and the other being coupled to the traction wheels.

Figure 4:
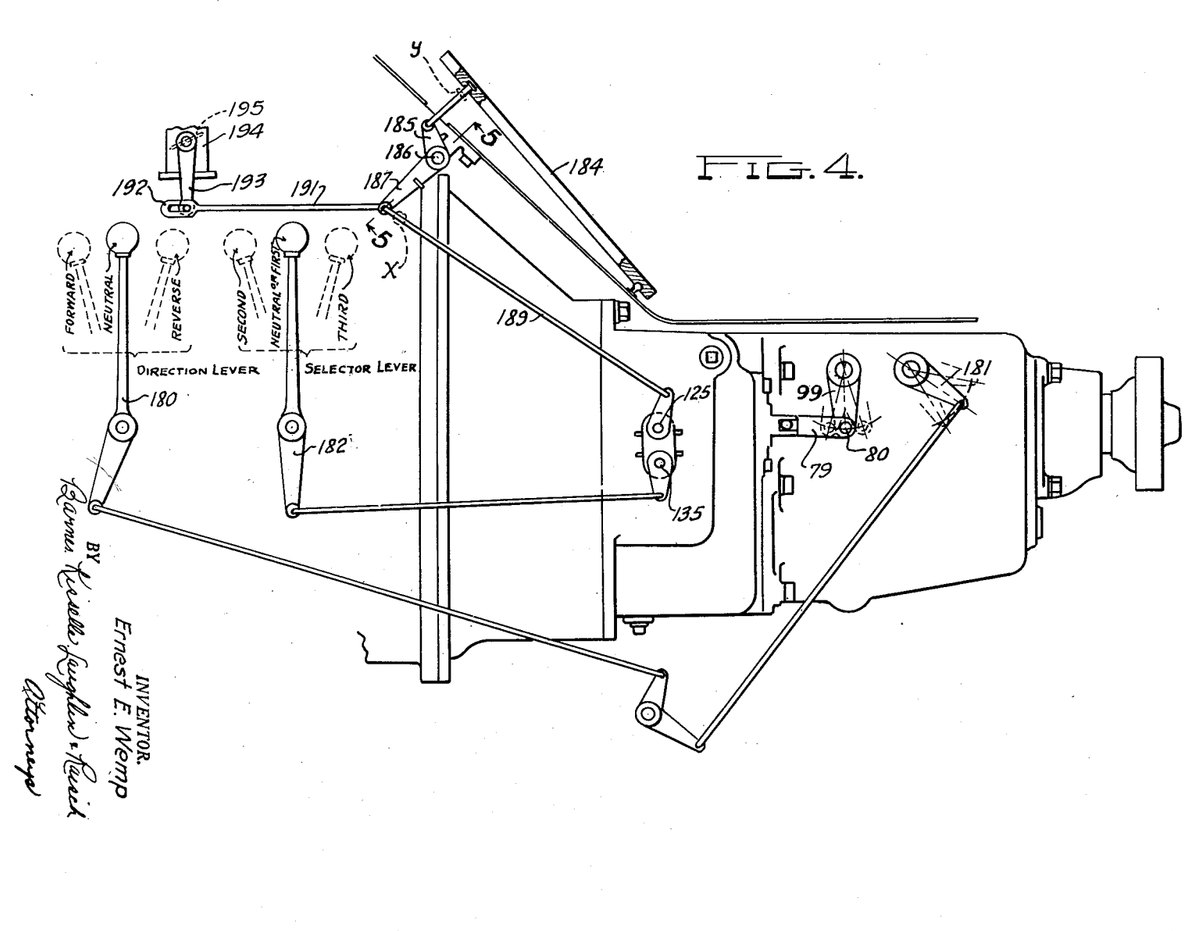
Fig. 4 is a side elevational view of the clutch housing and transmission and illustrating some of the controlling mechanism which is operated by the driver or operator of the vehicle.

Proceeding now to the control means for the operator or driver as shown in Fig. 4. There is a direction lever 180 diagrammatically shown in Fig. 4. This lever may be conveniently positioned in the driver's compartment. This lever is connected through the linkage shown to a control arm 181 of the gear shift transmission and there may be three positions. The center position may be neutral, in which there is no connection in the transmission; one position may be reverse which connects the reverse gears in the transmission; the other position is for forward which connects the low gear train in the transmission for a forward drive. It must be remembered at this point that the low gear train embodies an overrunning coupling or clutch.

There is a selector lever 182 connected by a link, as shown, to the control shaft 135 for the selector valve 100 (see Fig. 6). This lever has three positions as indicated, namely, a neutral position and positions for two other forward gear ratios which may be termed second gear and third or high gear. It should be remembered at this point that the lever 180 establishes a low gear drive.

The throttle member or accelerator treadle is shown at 184 connected by a link 185 to a rock shaft 186. An arm 187 is mounted on the rock shaft through the means of a one way coupling and a torsion spring 188 and this arm is connected through a link 189 to the valve controlling shaft 125. The hub of arm 187 has one half cut away as at 195 for a one way connection with a key as shown in Fig. 5. Another arm 190 is connected to the fuel supply or carburetor for the engine. This connection may be through a link 191 which has a lost motion connection at 192 with the throttle control arm 193 of the carburetor 194 having a throttle valve 195. With this arrangement the throttle member 184 may move to the position $y$ before there is any movement imparted to the carburetor control arm 193 and during this movement the arm 187 moves from the position shown to a position at about $x$ for shifting the shaft 125 for the control valves.

The operation of the mechanism is as follows:

With the engine of the vehicle idling, say about 500 or 600 R. P. M., the centrifugal clutch is disengaged. This clutch may engage centrifugally at about 700 or 800 R. P. M. Preferably, the centrifugal weight system is of relatively light construction and not capable of transmitting maximum engine torque up to speeds of rotation of about 1800 to 2000 R. P. M. This promotes smoothness of clutch engagement and the clutch packing pressure is supplemented hydraulically by the piston 61. With the direction lever 181 positioned in neutral the transmission 21 is in neutral and the engine may be accelerated as desired without imparting any torque to the traction wheels. If it is desired to move the vehicle forward, the direction lever 180 is shifted to the forward position. This establishes a connection through the low gear train in the transmission with the overrunning or one-way drive coupling.

The selector lever may be positioned in the central position which is both neutral and first speed. In this position, the selector valve 100 is disposed as shown in Fig. 15a with the high pressure line closed off from the gear shift servo cylinder 75 and with both ends of the clutch servo cylinder discharged of liquid to the sump through the ports 116 and 117. Therefore, the piston 78 is in the middle position as shown in Fig. 10 and the connection 80 is in the neutral position, as shown in Fig. 4. When the treadle 184 is depressed it first moves through the lash movement or last motion or to the position $y$ and this rocks the control shaft 125 and through the linkage, above described, rocks the control valve 85. The normal position of the control valve 85 is as shown in Fig. 13 where the high pressure line is cut off from the clutch servo cylinder and, as shown in Fig. 8, where the high pressure line is connected to the power coupler control cylinder 55. In the lash movement of the treadle, the valve 85 is shifted about 90° counter-clockwise as Fig. 13 is viewed. This connects the clutch servo cylinder with the high pressure line of the pump. This movement of the valve, clockwise as Fig. 8 is viewed, disconnects the high pressure line from the power coupler control cylinder 55, this being the position shown in Fig. 7. Further, depression of the accelerator treadle increases the R. P. M. of the engine and causes the clutch to centrifugally engage with resultant rotation of the clutch shaft 10. Upon commencement of rotation of the shaft 10, a dental engagement of the power coupling will be made as this is permitted due to the fact that the high pressure liquid is cut off from the cylinder 55. This will then drive the power input member 32 and transmit power to the output member 23 and cause the vehicle to move forward in low gear. At the same time, the pump will start to operate and liquid under pressure is conveyed to the cylinder 60 and the clutch packing pressure is augmented hydraulically. Under these conditions, a desired low pressure is maintained in the hydraulic system by the low pressure relief valve 91. Since the accelerator is depressed beyond the position $y$ the cam 145 is rotated so as to engage the detent 82 and thus the gear shift servo piston is locked mechanically in its intermediate or neutral position. If the accelerator is allowed to retract the valve 85 is restored to the position shown in Figs. 13 and 8. This cuts off the hydraulic pressure to the clutch servo cylinder and allows liquid under pressure to enter the cylinder 55. This action causes the piston 56 to shift and to rock the yoke 140, which shifts the coupler element 154 to disengage the teeth 157 and 152.

Now, any time that the vehicle is being operated in low gear, the selector lever 182 may be shifted into either second gear or third gear positions. Suppose, for example, it is shifted to the second gear position; this moves the valve 100 from the set of conditions shown in Fig. 15a to the set of conditions shown in Fig. 15b. The selector valve is now conditioned for the entrance of liquid under pressure into the gear shift servo cylinder through port 105 and passage 77, and conditions the valve for the discharge of the opposite end of the cylinder through passage 76 and ports 116 and 117. Nothing happens, however, because of the control valve 101. When the accelerator treadle is depressed the port 102, as shown in Fig. 15, is in the dotted line position and, therefore, closes off the high pressure line; the port 102a, shown in Fig. 16, is in the dotted line position and is, therefore, in a position to exhaust the gear shift servo cylinder through the line 77 but the cylinder is already exhausted of high pressure. Movement of the selector valve to the second gear position merely conditions the selector valve 100, as shown in Fig. 15b, with no attendant to function. However, when the accelerator treadle is released, the pressure liquid is introduced into the power coupler control cylinder 55 through port 95 of valve 85 (Figs. 7 and 8); this shifts the yoke and breaks the power coupling and through the arm 143 rocks the control valve 100 to the full line positions shown in Figs. 15 and 16. Port 102, therefore, connects the high pressure line with the passage 77 through port 105 and the piston 78 is shifted to establish the second gear ratio. This shift is permitted because the detent 82 was released when the treadle was allowed to retract. Inasmuch as the port 109 (Fig. 16) is in a position to exhaust passage 77 there would be no pressure built up to shift the piston 78 if this exhaust condition continued. But, the port 102a has, upon retraction of the accelerator, moved to the full line position and this closes the exhaust line for the passage 77 and the left hand end of the cylinder 75, as Fig. 10 is viewed. Upon depression of the accelerator, after the second gear ratio has been established, the liquid under pressure is transmitted through valve 85 to the clutch servo cylinder (Fig. 13) and the pressure liquid is cut off from the power coupler control cylinder (Fig. 7) and the valve 101 is moved to the dotted line positions shown in Figs. 15 and 16. Port 102, therefore, is positioned to close the high pressure line and port 102a is positioned to exhaust the left hand end of cylinder 75 through the passage 77 and the exhaust port 110. Accordingly, the cylinder 75 is exhausted of liquid from both ends during all normal driving. Note, however, that upon depression of the accelerator the piston 78 is mechanically locked in position by the detent 82.

Now, when the vehicle is moved forward in low gear, or in second gear for that matter, the selector lever 182 may be shifted to the third or high speed position. This conditions the selector valve 100 to the set of conditions shown in Fig. 15c. In other words, the valve 100 is shifted approximately 45° clockwise from the full line position shown in Figs. 15 and 16. When the accelerator is retracted which cuts off the pressure liquid from the clutch servo cylinder and supplies liquid to the power control cylinder, the resultant shift of the yoke breaks the power coupling and shifts the control valve 101 so that its ports 102 and 102a take the full line positions shown in Figs. 15 and 16. This introduces pressure liquid through the passage 76 and shifts the piston 78 to the left, as Fig. 10 is viewed, thus shifting the transmission control 80 to the third or direct drive position. At this time, of course, the left hand end of the cylinder 25 remains exhausted. Moreover, the right hand end of the cylinder 75, as Fig. 10 is viewed, is closed by reason of the disposition of the port 102a. When the accelerator is depressed the valves are shifted through the lash movement so that control valve 101 moves back to the positions shown in full lines in Figs. 15 and 16 and this closes off the high pressure line and discharges liquid from the gear shift servo cylinder through passage 76, port 102a and discharge port 110. The transmission servo piston is again mechanically locked by the detent 82.

Briefly reiterating this operation without a detailed reference to the valves, assume that the engine is idling; with the direction lever 180 in neutral position the engine may be accelerated as desired with no torque transmission to the traction wheels. To go forward, all the operator needs to do is shift the direction lever to the forward position. If the selector is in its middle position, as shown in Fig. 4, the vehicle will move forward upon depression of the accelerator. This movement will be in low gear. During vehicle movement in low gear the selector lever may be shifted as desired either to the second gear position or the third gear position. Then upon allowing the treadle to retract, the power coupling is broken hydraulically and the transmission is shifted hydraulically either into second or third gears depending upon which was selected. Then, upon depression of the accelerator, the power coupling is established and the car is propelled forwardly in the selected gear ratio. Each time the accelerator is depressed, liquid is transmitted to the cylinder 60 to provide supplemental clutch packing pressure; each time the accelerator is depressed liquid under pressure is cut off from the power coupler control cylinder 55 so that the power coupling engages when the driving member tends to exceed the R. P. M. of the driven member. Each time the accelerator is depressed liquid under pressure is cut off from the gear shift servo cylinder 75 and the end of the cylinder, which was just previously supplied with liquid under pressure, is dumped of its liquid through the port 102a. Each time the accelerator treadle is retracted to the full line position, shown in Fig. 4, liquid under pressure is cut off from the clutch servo cylinder 60; liquid under pressure is admitted to the power coupler control cylinder 55; the cam 145 unlocks the detent 82; and liquid under pressure is delivered to the gear shift servo cylinder 75 as determined, however, by the selector valve. This is a pre-selection and when the selector valve is in the position, shown in Fig. 15a, no liquid enters the gear shift servo cylinder. If the selector valve is moved to the condition shown in Fig. 15b, the transmission servo piston is moved to shift the transmission into second gear; if the selector valve has been pre-selected into the position shown in Fig. 15c the piston moves to shift the transmission into high gear. To reverse the vehicle the direction lever is shifted to reverse position and this closes the reverse gear train, so that upon the depression of the accelerator, a connection is established at the power coupler and the vehicle is moved in reverse.

So, it will be seen that in the normal forward operation of the vehicle the operator merely preselects the gear desired by shift of the lever 182 and this gear ratio is established upon release of the treadle. With the direction lever in forward position, the vehicle will always move forward upon depression of the treadle because the intermediate position of the selector lever connects the low gear train.

The mechanism provides a semi-automatic operation. A driver may operate the vehicle over long periods of time by controlling the same entirely by manipulation of the accelerator treadle. An example of this is as follows: Suppose the driver of an automotive vehicle is operating the vehicle in direct drive and it is necessary to bring the vehicle to a stop because, for example, of traffic regulations. The direction lever is in forward position and the selector lever is in direct drive position. The accelerator treadle is allowed to retract and the vehicle may be brought to a stop by an application of the brake. When the accelerator fully retracts, the mechanical lock or detent 82 for the piston 78 is released by the cam 145. Before the vehicle comes to a stop the centrifugal clutch disengages. The centering springs 81 and 82 shift the transmission piston 80 to its intermediate or neutral position. There is a loss of pressure liquid in the hydraulic system. Now, upon depression of the accelerator treadle the vehicle moves forward in low gear and the pump is actuated for setting up liquid pressure. As soon as sufficient speed is attained the accelerator is allowed to retract and the transmission is shifted into direct gear. This occurs because the operator has not disturbed the selector lever or the direction lever.

It will be noted that the pump is driven by gear 37, which in turn is driven by the transmission input member 32 and that the power coupling is located between the input member and the engine. The arrangement, however, provides for continued operation of the pump under certain conditions where the power coupling is disengaged. When, in the operation of the vehicle, the functions are such that the power coupling becomes disengaged, the pump is operated by the movement of the vehicle with the torque transmitted through the transmission if the transmission is in gear. When the transmission is in neutral, however, the movement of the vehicle does not drive the input member 32; if the power coupling is disengaged the engine cannot drive the input member 32 through the coupling. In this case, the overrunning clutch comprising the rollers 162 function to drive the input member 32 and, therefore, the pump. This will occur so long as the friction clutch is engaged either centrifugally or hydraulically. By referring to Fig. 20, it will be appreciated how clockwise rotation of the driving member 151 is transmitted through the rollers 162 which engage the inclined surfaces 161. This rocks the blocking element 160 to the limit of its loose spline connection on the member 32 where it picks up and drives the member 32. Thus, the construction shown in Fig. 20 not only serves the function of controlling the blocking action for the power coupler but serves, under certain conditions, to drive the pump of the hydraulic system.

In the event the engine is stalled and it is desired to start it by towing or pushing the vehicle, the coupling across the rollers 26 is established. One of the rollers gravitates and becomes compressively engaged in the notches as the member 23 rotates counter-clockwise as Fig. 3 is viewed. This drives the clutch shaft 10. If the transmission is in gear, the pump may be driven directly through the member 32 to the member 37. If the transmission is in neutral the driving member 151 of the power coupler will rotate clockwise as Fig. 20 is viewed and pick up the blocker ring 160 by the overrunning rollers 162 to cause turning of the member 32 and thereby drive the pump. Operation of the pump will, upon depression of the accelerator, cause liquid under pressure to be transmitted into the cylinder 60 to shift the piston and cause engagement of the friction clutch to thus rotate the engine.

I claim:

1. Means for shifting the gears in a gear change transmission in an automotive vehicle or the like having an engine with a throttle, said transmission having a shiftable member, a double ended cylinder, a piston therein connected to the shiftable member, a pump for liquid, a pressure line connecting the pump and both ends of the cylinder including a control valve chamber and a selector valve chamber, the selector valve chamber being positioned between the control valve chamber and the cylinder, a selector valve in the selector valve chamber movable selectively to close the cylinder from the control valve chamber while venting both ends of the cylinder and to connect one end of the cylinder while venting the opposite end of the cylinder, a control valve in the control valve chamber, means connecting the control valve with the throttle to be actuated thereby, said control valve ported and operable by the throttle to connect the pump with the selector valve chamber, the selector valve serving as selected to close the pressure line and to direct the liquid under pressure to the selected end of the cylinder, said control valve being also ported to vent the selected end of the cylinder when the control valve is shifted by the throttle to close the pressure line to the selector valve chamber.

2. Means for shifting the gears in a gear change transmission of an automotive vehicle having an engine, a throttle for the engine, said transmission having a shiftable member with two extreme gear ratio positions and an intermediate position, a double ended cylinder, a piston therein connected to the shiftable member, spring means normally holding the piston centralized to effect intermediate position of the shiftable member, a pump for liquid, a pressure line connecting the pump and both ends of the cylinder including a control valve chamber and a selector valve chamber, the selector valve chamber being positioned between the control valve chamber and the cylinder, a selector valve in the selector valve chamber movable selectively to close the cylinder from the control valve chamber while venting both ends of the cylinder and to connect one end of the cylinder while venting the opposite end of the cylinder, a control valve in the control valve chamber ported and operable to connect the pump with the selector valve chamber, means connecting the throttle and the control valve for operating the control valve by movements of the throttle, the selector valve serving as selected to close the pressure line and to direct the liquid under pressure to the selected end of the cylinder, said control valve being also ported to vent the selected end of the cylinder when the control valve shifts to close the pressure line to the selector valve chamber.

3. Means for shifting the gears in a gear change transmission of an automotive vehicle having an engine a throttle for the engine, said transmission having a shiftable member with two extreme gear ratio positions and an intermediate position, a double ended cylinder, a piston therein connected to the shiftable member, spring means normally holding the piston centralized to effect intermediate position of the shiftable member, a pump for liquid, a pressure line connecting the pump and both ends of the cylinder including a control valve chamber and a selector valve chamber, the selector valve chamber being positioned between the control valve chamber and the cylinder, a selector valve in the selector valve chamber movable selectively to close the cylinder from the control valve chamber while venting both ends of the cylinder and to connect one end of the cylinder while venting the opposite end of the cylinder, a control valve in the control valve chamber ported and operable to connect the pump with the selector valve chamber, means connecting the throttle and the control valve for operating the control valve by movements of the throttle, the selector valve serving as selected to close the pressure line to direct the liquid under pressure to the selected end of the cylinder, said control valve being also ported to vent the selected end of the cylinder when the control valve shifts to close the pressure line to the selector valve chamber, and mechanical means operable by the throttle for locking the piston in position centrally or at either end of the cylinder.

4. Means for shifting the gears in a gear change transmission in an automotive vehicle or the like, said transmission having a shiftable member with two extreme positions for two gear ratios and an intermediate position for neutral, a double ended cylinder, a piston therein connected to the shiftable member, a pump, a pressure line connecting the pump and the cylinder, a throttle member for the engine, a control valve in the pressure line operated as the throttle member is released to cut the power from the engine to open the pressure line to the cylinder, selector valve means in the pressure line arranged to be shifted to pre-select the end of the cylinder to which the pressure line is connected for corresponding movement of the shiftable member, the control valve serving to close the pressure line to the cylinder when the throttle member is actuated for engine acceleration, and means actuated by the throttle member for mechanically locking the piston in any given position of adjustment when the throttle member is actuated for engine acceleration.

5. Means for shifting the gears in a gear change transmission disposed between the engine and the traction wheels of an automotive vehicle, said transmission having a shiftable member movable to extreme positions for two gear ratios and to an intermediate position for neutral, a cylinder, a piston thereon connected to the shiftable member, yieldable means normally holding the piston centralized with the transmission in neutral, a throttle member for the engine, a pump, a pressure line connecting the pump and the cylinder, valve means in the pressure line including a selector valve and a control valve, the selector valve being operable at will to open one end of the cylinder to the pressure line while venting the other end, means operable by the throttle member when the throttle member is moved to cut the power of the engine to open the control valve and connect the pump to the end of the cylinder determined by the position of the selector valve to cause shift of the piston and change of gears, said valve means arranged to vent both ends of the cylinder when the throttle member is actuated to cause power to be delivered from the engine, and mechanical means operated by the throttle member to lock the piston in a given position of adjustment when the throttle member is actuated to cause the engine to deliver torque and to unlock the piston for movement thereof by liquid under pressure when the throttle member is actuated to cut the power from the engine.

6. Means for shifting the gears in a gear change transmission which is disposed between the engine and the traction wheels of an automotive vehicle or the like, said transmission having a shiftable member, a cylinder, a piston in the cylinder connected to the shiftable member, a pump for supplying liquid under pressure, conduit means between the pump and the cylinder, controlling valve means in the conduit means, a throttle for the engine, means interconnecting the throttle and the controlling valve means to operate the valve means for the introduction of liquid under pressure to the cylinder as the throttle is operated to cut the power of the engine for shift of the piston and shift of the transmission, the controlling valve means being arranged to vent the cylinder when the throttle is depressed to accelerate the engine, and mechanical means operated by the throttle for locking the piston in position when the throttle is actuated to cause the engine to deliver torque and to unlock the piston when the throttle is actuated to cut the power from the engine.

7. Means for shifting the gears in a gear change transmission disposed between the engine and the traction wheels of an automotive vehicle or the like, said transmission having a shiftable member with two extreme gear ratio positions and an intermediate position, a double piston therein connected to the shiftable member, a pump for supplying liquid under pressure, conduit means extending from the pump to opposite ends of the cylinder, a selector valve and a control valve disposed in series in the conduit means, the selector valve being operable at will to open the conduit means to a selected end of the cylinder, a throttle for the engine, means interconnecting the throttle and the control valve and operable to cause the control valve to open the conduit means to the end of the cylinder as selected by the selector valve when the throttle is actuated to cut the torque of the engine, the valve means being arranged to vent both ends of the cylinder when the throttle is actuated to cause power to be driven from the engine and mechanical locking means operated by the throttle to release the piston for movement when the throttle is actuated to cut the torque of the engine and to lock the piston in a given position when the throttle is actuated to cause the engine to deliver torque.

ERNEST E. WEMP.

REFERENCES CITED

The following references are of record in the file of this patent:

UNITED STATES PATENTS

| Number | Name | Date |
|---|---|---|
| 2,124,507 | Hodgkins | July 19, 1938 |
| 2,313,438 | Hoelscher | Mar. 9, 1943 |
| 2,454,614 | Peterson et al. | Nov. 23, 1948 |
| 2,459,361 | Carnagua et al. | Jan. 18, 1949 |

FOREIGN PATENTS

| Number | Country | Date |
|---|---|---|
| 670,844 | Germany | Jan. 27, 1939 |